United States Patent [19]
White

[11] 3,925,945
[45] Dec. 16, 1975

[54] HEAT EXCHANGER WINDOW

[76] Inventor: Walter S. White, 833 Old Dutch Mill Road, Colorado Springs, Colo. 80904

[22] Filed: Nov. 23, 1973

[21] Appl. No.: 418,606

[52] U.S. Cl. .................................. 52/171; 52/616
[51] Int. Cl.² ........................ E06B 7/12; E04B 2/28
[58] Field of Search ............ 52/473, 171, 172, 302, 52/304, 616, 398–400, 393, 476, 201, 202; 165/49; 49/388–392, 64; 126/270, 200

[56] References Cited
UNITED STATES PATENTS

| | | | |
|---|---|---|---|
| 1,974,739 | 9/1934 | Fraps | 52/171 |
| 2,164,815 | 7/1939 | Hadjisky | 52/304 |
| 2,631,339 | 3/1953 | Pratt | 49/64 |
| 2,889,591 | 6/1959 | Pratt | 160/107 |
| 2,918,709 | 12/1959 | Corcoran | 49/390 |
| 3,332,192 | 7/1967 | Kessler | 52/311 |
| 3,460,303 | 8/1969 | Algrain et al. | 52/616 |
| 3,591,248 | 7/1971 | Meunier et al. | 350/1 |

*Primary Examiner*—James L. Ridgill, Jr.
*Attorney, Agent, or Firm*—Richard W. Hanes

[57] ABSTRACT

A transparent insulating building panel having a pivotally mounted frame which carries a pane of heat absorbing glass spaced from a glass insulating panel comprising at least two panes of clear glass separated by a clear air space and including apertures in the frame providing free air paths into and out of the space between the heat absorbing glass and the insulating panel.

3 Claims, 6 Drawing Figures

HEAT EXCHANGER WINDOW

The primary object of the present invention is to provide a glass panel assembly for the exterior walls of buildings which will utilize the heat exchanging properties of tinted glass to increase the efficiency of summer solar heat rejection and to create an additional interior source of building heat in the winter.

This object, along with other objectives of the invention, may better be understood by the following detailed description of a preferred form of the invention taken in conjunction with the accompanying drawings in which.

A building having large exterior surface areas of glass, such as are common in contemporary architectural design, can benefit by this invention from a property of the type of glass which is typically used. In order to change the color of the light passing through the glass exterior walls and to accomplish certain esthetic effects, it is common to tint the glass to a bronze, blue or green hue in order to reduce the frequency of the light energy. Reducing the frequency creates excess heat energy which is absorbed by the glass. This fact is not a novel discovery, however, the structure about to be described is one conceived to utilize the convective heat currents which result from air coming into contact with the glass which has itself been heated by the solar heat energy passing therethrough.

The prior art has seen the use of heat absorbant glass disposed in spaced relation from a single sheet of clear glass and having a dead air space in between to reduce heat transfer between the outside and interior of the building. The structure characterized by this invention, however, provides a free air space between a sheet of heat absorbing glass and an insulating glass so that the heat energy absorbed by the glass may be converted into convective heat and either conducted outside of the building or carried to the interior of the building where it can add heat in the winter months.

Figure 1:
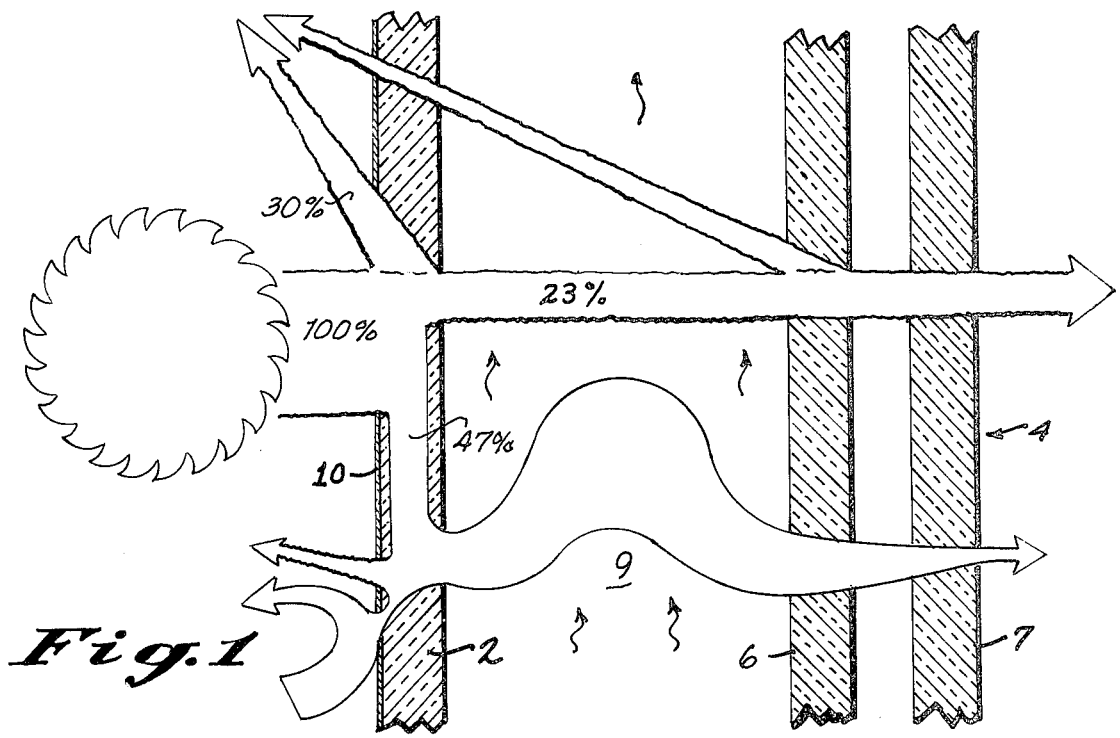
FIG. 1 is a diagramatic cross-sectional view of the glass arrangement of the building panel of the present invention illustrating the flow of heat energy where the heat absorbant glass pane is disposed on the outside of the building.

A diagramatic cross-section is shown in FIG. 1 where a heat absorbant glass 2, such as "Solarcool" Gray made by PPG Industries, Inc., is spaced from a double light glass unit 4 having a dead air space between the sheets of glass 6 and 7. In accordance with the manufacturer's specification, the heat absorbant glass will pass 23 percent of the total solar energy, reflect approximately 30 percent, and absorb the remainder, some of which is re-radiated, and some of which is transferred to the air currents on both sides of the glass sheet 2.

In the construction of the present invention (FIG. 1), the heat energy which is transferred to the free air in the space between the heat absorbing glass and the insulating glass panels is conveyed away by ducts or other means to the outside of the building. The insulating glass panel 4 acts as an additional buffer to reduce the transfer of the convective heat energy to the interior of the building.

Where it is desireable to accumulate heat energy inside the building, as in winter months, the glass wall assembly is reversed in position so that the insulating glass panel faces the exterior side and the free air space comes into communication with the interior of the building.

Figure 2:
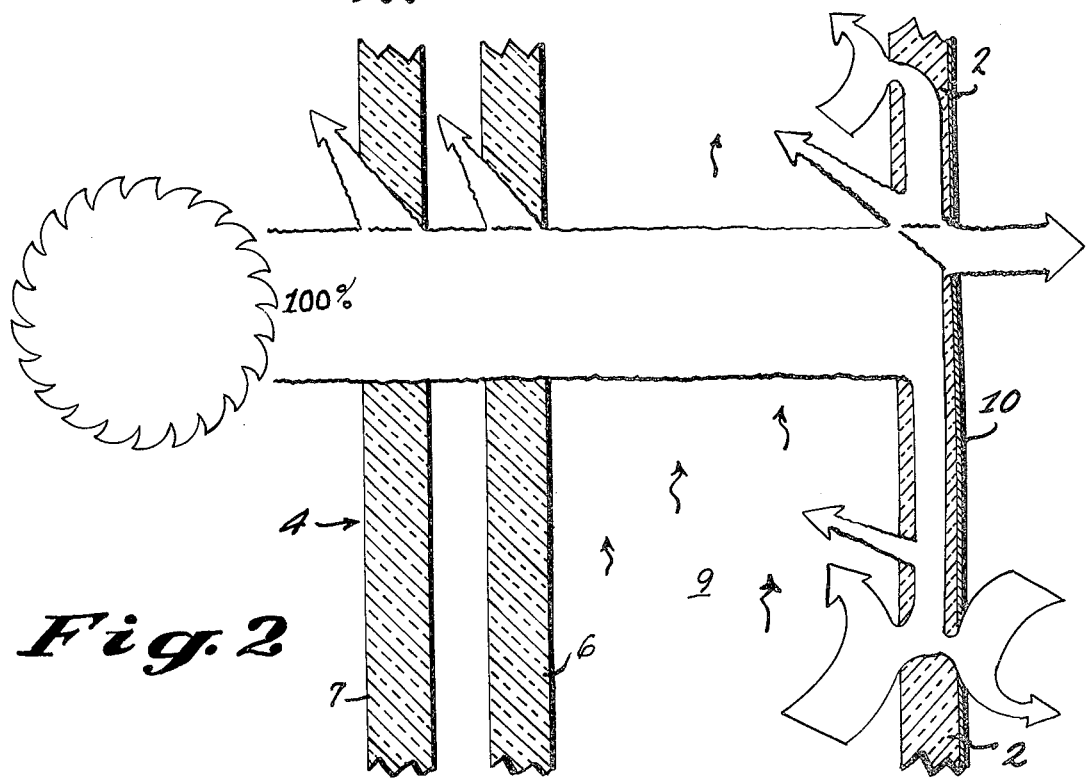
FIG. 2 is a diagramtic cross-sectional view of the glass arrangement of the building panel of the present invention illustrating the flow of heat energy where the heat absorbant glass pane is disposed on the interior side of the building.

As seen in FIG. 2, substantially all of the radiant energy from the sun passes through the insulating panel 4 and into the heat absorbing glass 2. There is some convective transfer of heat directly from the inside surface of the glass to the air in the room, however because of the larger temperature difference between the glass 2 and the free air in the duct space 9 there is a substantial transfer of heat to that free air. The free air rises in the duct space and is conveyed to the building interior where the warm air augments the normal source of heating energy.

An increase in efficiency can be obtained by adding a reflective coating 10 to the exterior surface of the heat absorbing glass 2. Such a coating acts to reflect unabsorbed heat energy back through the glass during which a portion of that reflected energy is absorbed by the glass and transformed into convective heat energy, as previously explained.

Figure 3:
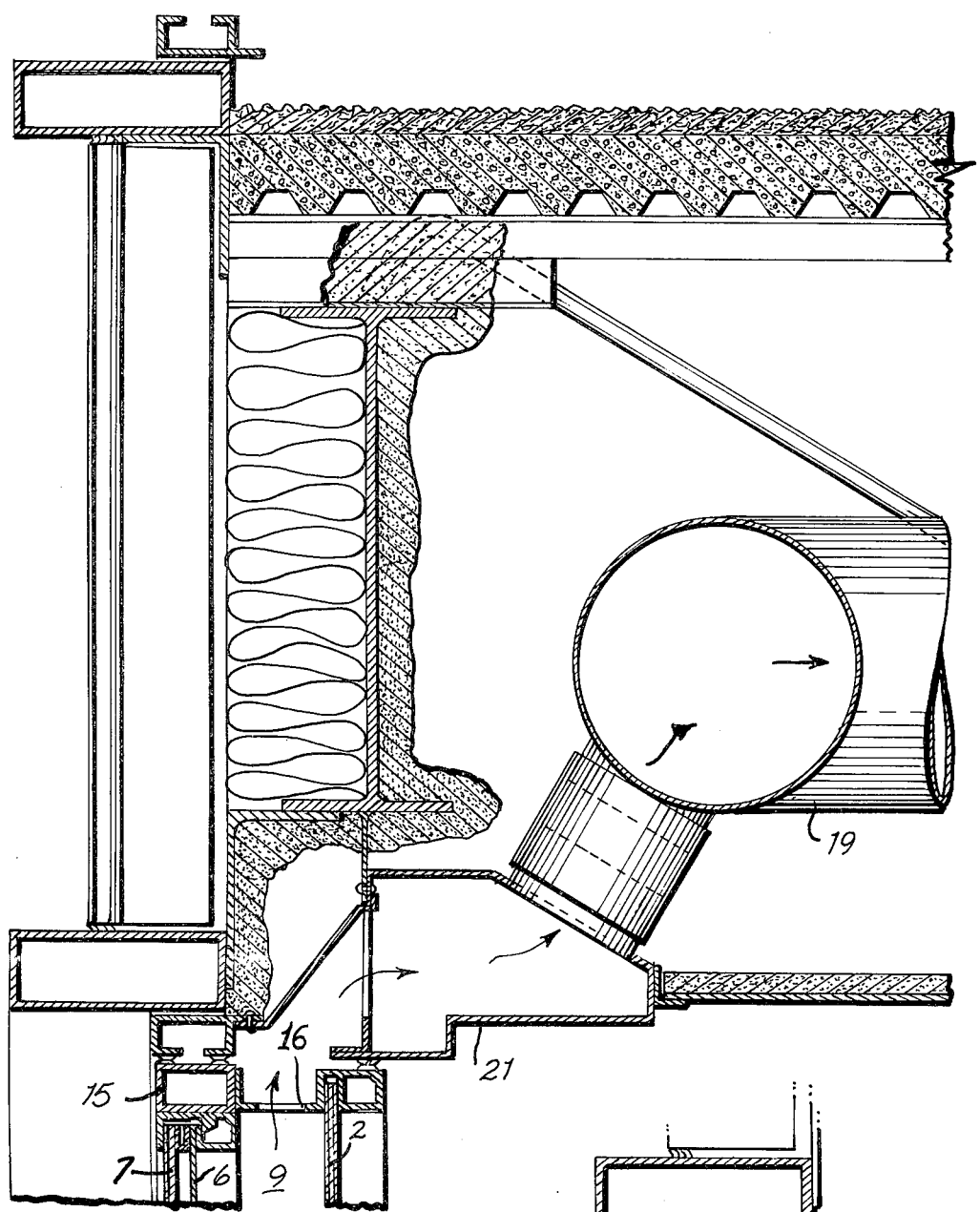
FIG. 3 is a fragmentary cross-sectional view of a portion of a building wall and floor structure showing the upper portion of a pivotal window frame panel of the present invention installed in the building and showing where collecting ducts are disposed in communication with the interior free air portion of the panel. The panel is positioned for cold weather operation.
Figure 4:
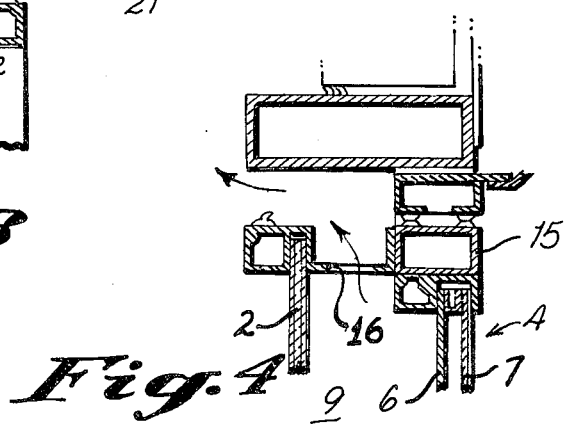
FIG. 4 is a fragmentary cross-sectional view of the top portion of the window panel of the present invention showing the window panel positioned for summer time operation.
Figures 5, 6:
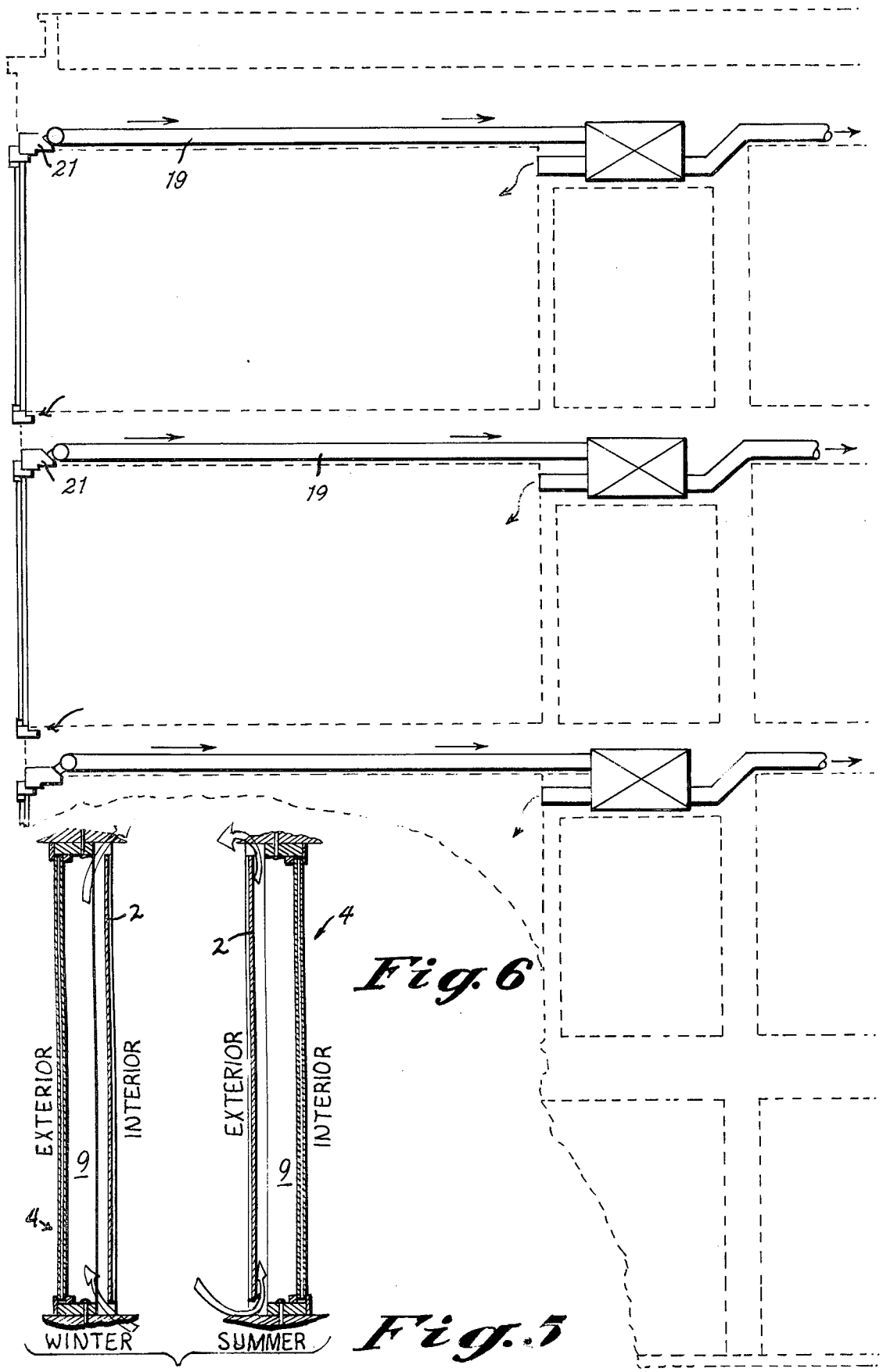
FIG. 5 is a cross-sectional view of the window panel of the present invention showing the air flow through the interior free air duct.
FIG. 6 is a diagramatic view of two floors of a building containing the building panel of the present invention and illustrating the ducts which connect the interior of the window panel to the conditioned air system of the building.

A preferred form of construction of the glass wall panel is shown in FIGS. 3 and 4. A pivotable window frame 15 constructed of extruded aluminum components is shown in combination with the structural components of a building wall. FIG. 3 illustrates the position of the window frame for cold weather operation while FIG. 4 is illustrative of summer time operation.

A sheet of heat absorbing glass 2 is positioned across an air duct 9 from a clear glass insulating panel 4 of glass sheets 6 and 7 having a dead air space therebetween. The air duct 9 is made to communicate with free air sources through apertures 16 in the top and bottom (not shown) of the frame.

On the particular embodiment of FIG. 3, sheet metal air collection ducts 19 are connected to a plenum 21 which covers the top of the window air duct 16. The air entering the duct may be drawn off by a fan or mixed with other conditioned air in the building supply. The ducting shown in FIGS. 2 and 3 is not a necessary element of the invention, it being understood that means can be provided for venting the air directly into the room from the plenum 21.

I claim:

1. A transparent insulating building panel reversibly mounted for positioning commensurate with the outside temperature, comprising:
   a frame pivotally mounted in the plane of a wall of said building,
   a pane of tinted heat absorbing glass mounted within said frame,
   a pair of spaced apart glass panes mounted within said frame and in air tight engagement therewith, said pair of panes mounted in spaced relation and parallel to said pane of heat absorbing glass, and
   aperture means in said frame providing an unrestricted path of air flow through the space between the heat absorbing glass and the said pair of panes.

2. The combination of claim 1 and further including at least a partially reflective surface coating on the exterior surface of the pane of heat absorbing glass.

3. The combination of claim 1 and further including air duct means disposed to communicate with at least some of the aperture means when the said panel is positioned so that the heat absorbing glass is juxtaposed to the interior of the building.

* * * * *